Sept. 20, 1960 W. D. LAWSON ET AL 2,953,690

PHOTOSENSITIVE CELLS, RADIATION FILTERS AND SEMICONDUCTOR MATERIALS FOR USE IN SUCH CELLS AND FILTERS

Filed Sept. 3, 1958

WILLIAM DONALD LAWSON
STANLEY NIELSEN
ALEXANDER SCOTT YOUNG
*Inventors*

By Lawson Lloyd Taylor
*Attorney*

United States Patent Office 2,953,690

Patented Sept. 20, 1960

2,953,690

PHOTOSENSITIVE CELLS, RADIATION FILTERS AND SEMICONDUCTOR MATERIALS FOR USE IN SUCH CELLS AND FILTERS

William Donald Lawson, Stanley Nielsen, and Alexander Scott Young, all of Malvern, England, assignors to National Research Development Corporation, London, England, a corporation of Great Britain Filed Sept. 3, 1958, Ser. No. 758,712

Claims priority, application Great Britain Sept. 3, 1957

12 Claims. (Cl. 250—211)

Figure 1:
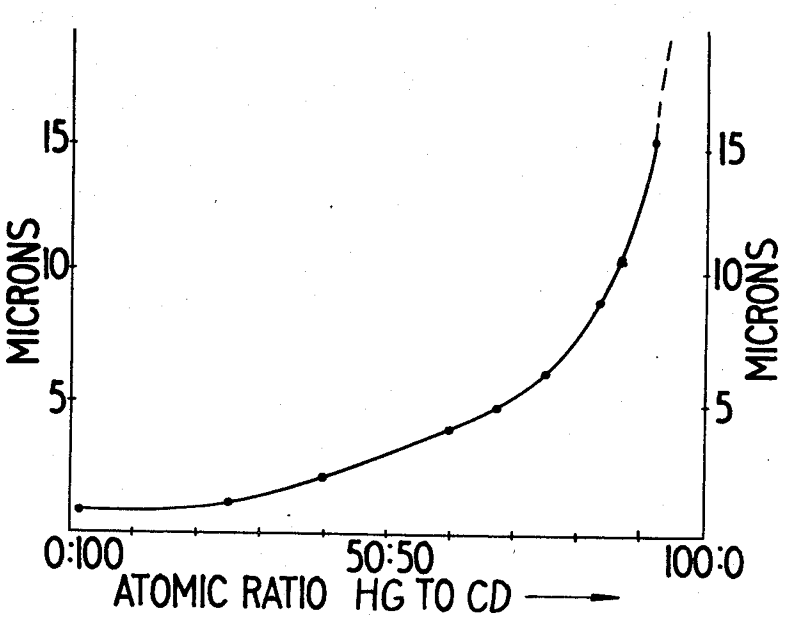

This invention relates to semiconductor materials, which can be employed in single-crystal form to make photosensitive cells and radiation filters operating in the infra-red regions, and to photosensitive cells and radiation filters making use of these materials.

Photosensitive cells employing photosensitive materials in crystal form are generally made as a thin elongated slab of single-crystal material having contacts at its ends and mounted on and insulated from a heat sink. In use the cell is connected by its end contacts in a suitable detection circuit. The thickness of the thin slab is generally chosen at a value, dependent mainly upon the optical absorption and resistivity of the material, to give an optimum photosensitivity.

An infra-red radiation filter using semiconductor material generally consists of a slice of single-crystal material suitably mounted for convenience of handling and support.

The absorption-wavelength characteristics of the photosensitive cell and the radiation filter depend upon the characteristics of the single-crystal material.

One useful absorption-wavelength characteristic is one in which for a given range of wavelengths commencing in the visible and extending into the infra-red the absorption is high and at or around a given wavelength in the infra-red the absorption falls rapidly and becomes negligible or small for increasing wavelength. This rapid fall in absorption is conveniently known as the absorption edge and is also conveniently designated by the wavelength at which the absorption has fallen to a certain value. In the present state of the art this definition of absorption edge is made as a matter of convenience and is somewhat arbitrary.

Where it is desired to obtain an absorption edge in a predetermined position a material having a suitable characteristic must be found. The characteristics of a large number of single-crystal semiconductor materials are known but it is not always possible to find a material having a desired characteristic; this difficulty is even more apparent as the wavelength at which the absorption edge occurs increases into the infra-red range, say above 10$\mu$.

An object of the present invention therefore is to provide a photosensitive semiconductor material of the kind which can be obtained in single-crystal form and which can, within limits, be made to have a predetermined absorption-wavelength characteristic.

It has been discovered that ternary alloys of cadmium, tellurium and mercury can be made, in which the absorption-wavelength characteristic is dependent upon the atomic proportion of cadmium to mercury in the alloy.

According to the invention therefore a semiconductor material of the kind referred to comprises a ternary alloy containing substantially fifty atomic percent of tellurium and the balance being made up of the elements cadmium and mercury whereby the absorption-wavelength characteristic of the compound is determined according to the atomic proportion of cadmium to mercury.

According to the invention in another aspect a photosensitive cell makes use of a photosensitive semiconductor material comprising a cadmium-tellurium-mercury ternary alloy. The material is preferably in single-crystal form.

According to the invention in yet another aspect an infra-red radiation filter makes use of a semiconductor material comprising a cadmium-tellurium-mercury ternary alloy.

Figure 2:
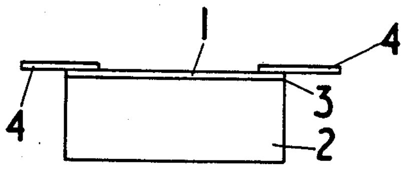
Figure 4:
Figure 3:
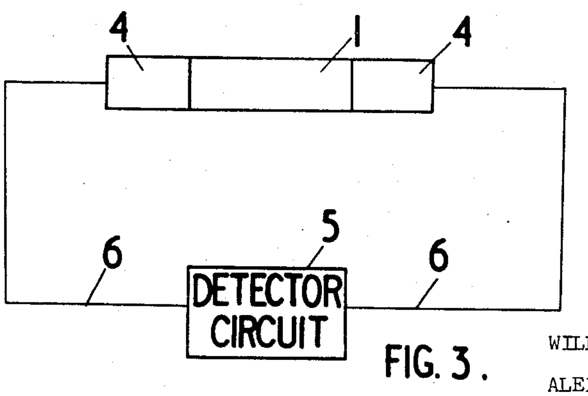

In order to make the invention clearer the ternary alloy material will now be referred to in relation to its manufacture and the range of absorption-wavelength characteristics which is obtained; examples of a photosensitive cell and an infra-red radiation filter making use of the material will also be described. Reference will be made to the accompanying drawings in which:

Fig. 1 shows a curve relating the position of the absorption edge of the material with the atomic ratio of cadmium to mercury, Fig. 2 shows a typical photosensitive cell making use of the material, Fig. 3 shows a typical circuit arrangement for a photosensitive cell, and Fig. 4 shows a typical infra-red radiation filter.

A semiconductor material according to the invention can be made by mixing the three elements cadmium, tellurium and mercury in a crucible, closing the crucible, and heating at a temperature between 600° C. and 1100° C. depending on the ratio of mercury to cadmium. A convenient method is that described in detail in the T.R.E. Journal, January 1952, page 75 onwards for lead selenide and lead telluride; in the case of the particular elements with which this invention is concerned care must be taken to avoid explosions due, it is believed, to the ease with which mercury vapourises at elevated temperatures. In this connection the use of a thick-walled crucible and adequate shielding during heating are advisable.

A second method of making materials according to the invention which reduces the explosion hazard referred to in the method described above is to make the ternary alloy by mixing together and heating in a sealed crucible the two binary compounds cadmium telluride and mercury telluride. The two binary compounds are made separately by weighing up the elemental constituents of each in appropriate proportions and inserting them into thick-walled crucibles which are then evacuated to at least $10^{-6}$ mm. of mercury.

After evacuation the crucibles are sealed and their temperatures raised in a furnace to the region of 100° C. above the melting point of the respective binary compounds. During this heating the crucible is gently rocked; the heating is continued for about 20 hours. After this time the crucible is cooled, opened and the binary compound extracted.

Appropriate proportions of binary compounds so made are then weighed out and made up to form the ternary alloy; the method proceeds in a way similar to that described for preparing the binary compounds.

The ternary alloy is then prepared in single crystal form by any convenient method, for example the method already used for lead telluride and lead selenide and described by Lawson, J. Appl. Physics 22, 1444, 1951. Alternatively single-crystal formations can be grown by seed methods such as those described by Folberth & Weiss, Z. Naturforsching 10a, 615, 1955; Bennett & Sawyer, Bell Syst. Tech. J. 35, 637, 1956; Kroger & de Nobel, J. Electronics 1, 190, 1955. For example, a long length of the ternary alloy is prepared for zone melting and a seed crystal is placed close to one end of the length. A molten zone is established near but not quite at the end where the seed crystal is situated. The zone is gradually advanced along the material until at the end some molten material makes contact with the seed; then the direction of movement of the molten zone is reversed and gradually taken along the material away from the seed. In this action the material effectively grows in single crystal form on to the seed and a single crystal ingot is formed.

A photosensitive cell is prepared from the material of the ingot by cutting thin slices from it. The sensitivity of the photosensitive cell depends on achieving a suitably thin slice generally less than 50$\mu$, and therefore, after cutting, the thin slice is etched until the desired thickness is achieved. After etching to the desired thickness contacts are soldered to the ends of the slice; other methods of applying contacts may be used when convenient, for example, by sputtering or firing-on of silver. Finally the slice is secured to, but where necessary electrically insulated from, a suitable heat sink, for example a sheet of aluminium anodised where it is in contact with the slice or a sapphire plate or slip; the slice can be cemented to the heat sink by means of a thin film of epoxy resin adhesive.

A completed cell is shown in elevation in Fig. 2 where a slice 1 of mercury-cadmium-telluride material is mounted on a heat-sink 2 consisting of a mass of metal; the slice 1 is secured to the heat sink 2 by a layer 3 of an epoxy resin adhesive. Silver contacts 4 are soldered on to the end of the slice 1.

In operation the cell is connected, as shown in Fig. 3, to a suitable detector circuit 5 by means of leads 6 which are themselves secured by the contacts 4 of the cell.

An infra-red radiation filter is shown in Fig. 4 and consists of a slice of the semiconductor material 7 mounted between frame members 8. The transmission characteristic of the filter corresponds to the absorption-wavelength characteristic of the semiconductor material; the thickness of the slice determines the transmission of the filter in the transmission part of the characteristic and may be chosen accordingly.

It is found, that if the atomic proportions of cadmium and mercury are changed from the condition where very little mercury, i.e. only a trace, is present to the condition where mercury is predominant, the resulting range of photosensitive materials shows a variation of absorption-edge extending from just above 0.8$\mu$ through 15$\mu$. An alloy material having an absorption edge at 15$\mu$ atomic percent of tellurium and the atomic ratio of cadmium to mercury was eight to ninety-two. The range of variation of the absorption edge extends up to an upper limit not yet specifically determined but believed to be beyond 35$\mu$. In fact, a smooth curve can be drawn showing the variation of absorption edge with variation of the atomic ratio of cadmium to mercury. This is shown in Fig. 1. It will be appreciated that this represents a very wide range of possible values of the absorption edge of a photosensitive material; the range clearly extends over the more commonly used infra-red wavelength bands and beyond into the, relatively less explored, higher infra-red wavelengths above 15$\mu$.

We claim:

1. A photosensitive cell consisting of in combination a mass of photosensitive semiconductor material essentially comprising a ternary alloy of tellurium, cadmium, and mercury, 50 atomic percent of said alloy being tellurium, and said cadmium and mercury being in an atomic proportion providing a predetermined absorption-wavelength characteristic, and current carrying connections to the mass.

2. A photosensitive cell as claimed in claim 1, wherein the semiconductor material is in single-crystal form.

3. A photosensitive cell as claimed in claim 1, wherein the semiconductor material is mounted on means for conveying heat from the material.

4. A photosensitive cell as claimed in claim 3, wherein the semiconductor material is mounted on a sheet of aluminium anodised on that part thereof making contact with the material.

5. A photosensitive cell claimed in claim 3, wherein the semiconductor material is mounted on a sapphire plate.

6. A photosensitive cell as claimed in claim 2, wherein the semiconductor material is mounted on means for conveying heat from the material.

7. A photosensitive cell as claimed in claim 6, wherein the semiconductor material is mounted on a sheet of aluminium anodised on the part thereof making contact with the material.

8. A photosensitive cell as claimed in claim 6 wherein the semiconductor material is mounted on a sapphire plate.

9. An infra-red radiation filter consisting of a slice of semiconductor material essentially comprising a ternary alloy of tellurium, cadmium, and mercury, 50 atomic percent of said alloy being tellurium and said cadmium and mercury being in an atomic proportion providing a predetermined absorption-wavelength characteristic.

10. An infra-red radiation filter as claimed in claim 9, wherein the semiconductor material is in single-crystal form.

11. A semi-conductor material having a predetermined absorption-wavelength characteristic, essentially comprising a ternary alloy of tellurium, cadmium, and mercury, 50 atomic percent of said alloy being tellurium, and said cadmium and mercury being in an atomic proportion providing said predetermined absorption-wavelength.

12. A semi-conductor material according to claim 11 wherein said atomic ratio of cadmium to mercury is eight to ninety-two.

References Cited in the file of this patent

UNITED STATES PATENTS

| | | |
|---|---|---|
| 1,824,573 | Schroter | Sept. 22, 1931 |
| 2,651,700 | Gans | Sept. 8, 1953 |
| 2,743,430 | Schultz et al. | Apr. 24, 1956 |
| 2,750,541 | Ohl | June 12, 1956 |

OTHER REFERENCES

"Some Aspects of the Luminescence of Solids," Kroger, Elsevier Publishing Co., Inc., New York, published in 1948, page 269.